May 16, 1939. W. A. HART 2,158,720
SPIRAL BROACH DEVICE
Filed July 19, 1935 3 Sheets-Sheet 1
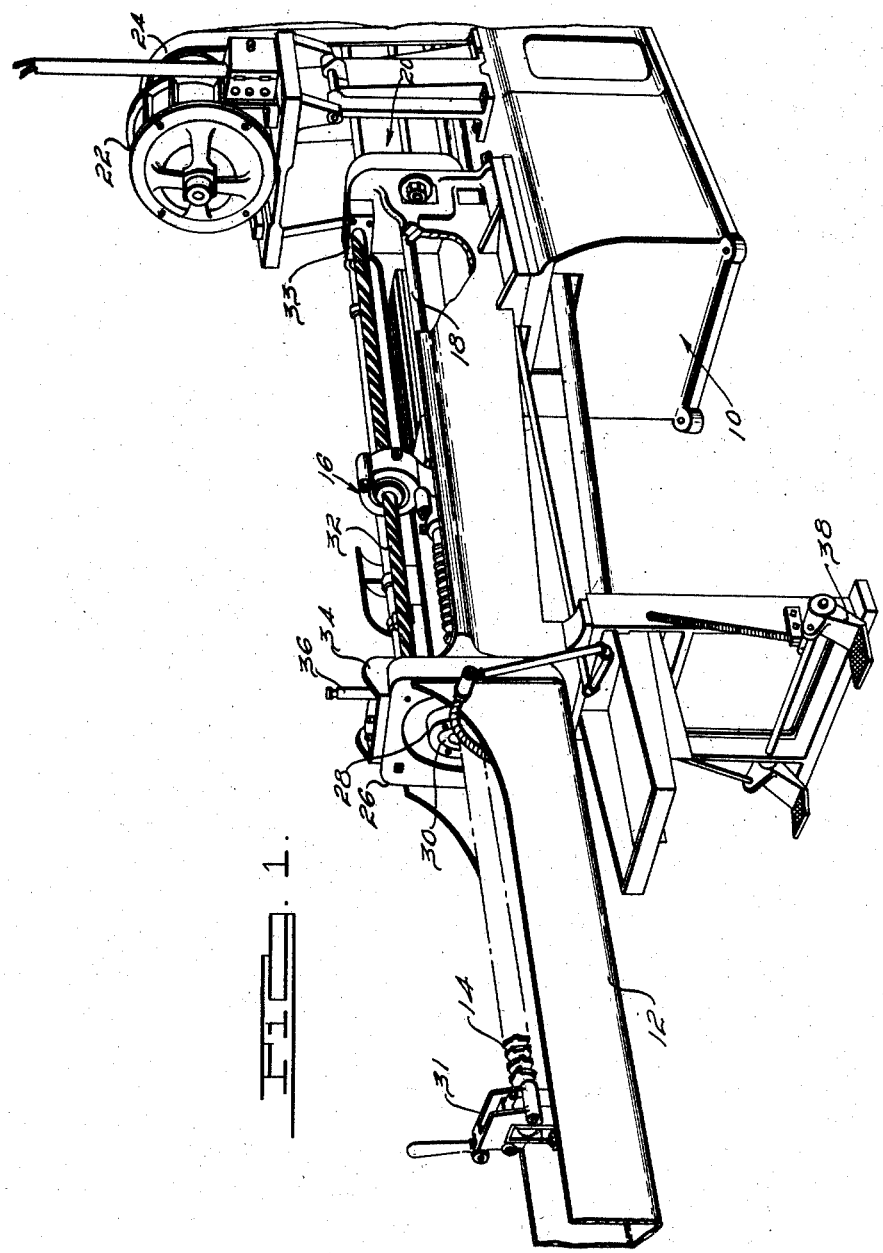
INVENTOR.
William A. Hart.
BY
Harness, Dickey Pierce & Hann.
ATTORNEYS.

May 16, 1939. W. A. HART 2,158,720
SPIRAL BROACH DEVICE
Filed July 19, 1935 3 Sheets-Sheet 2
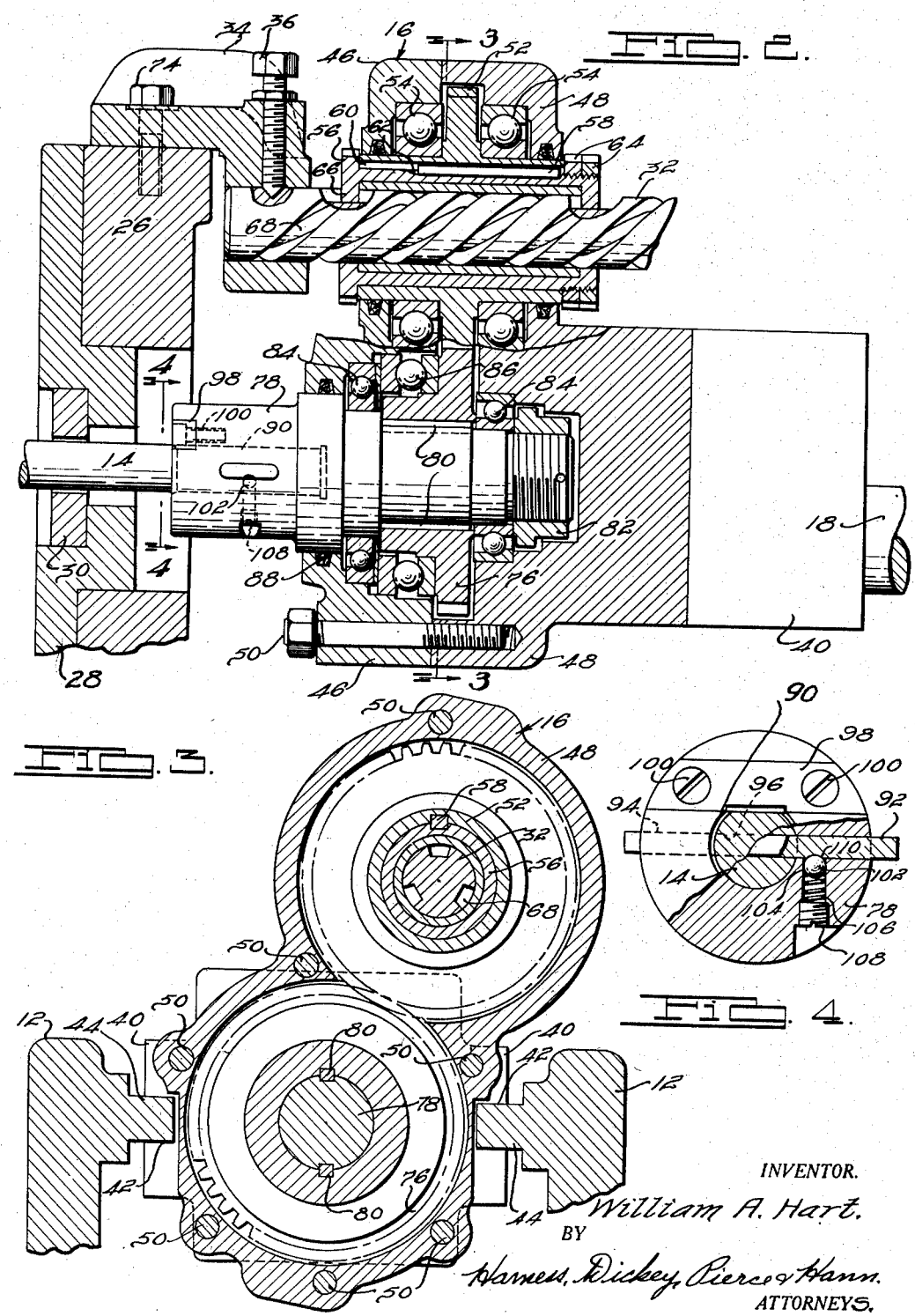
INVENTOR.
William A. Hart.
BY
Harness, Dickey, Pierce & Hann.
ATTORNEYS.

May 16, 1939.         W. A. HART          2,158,720
                    SPIRAL BROACH DEVICE
             Filed July 19, 1935       3 Sheets-Sheet 3
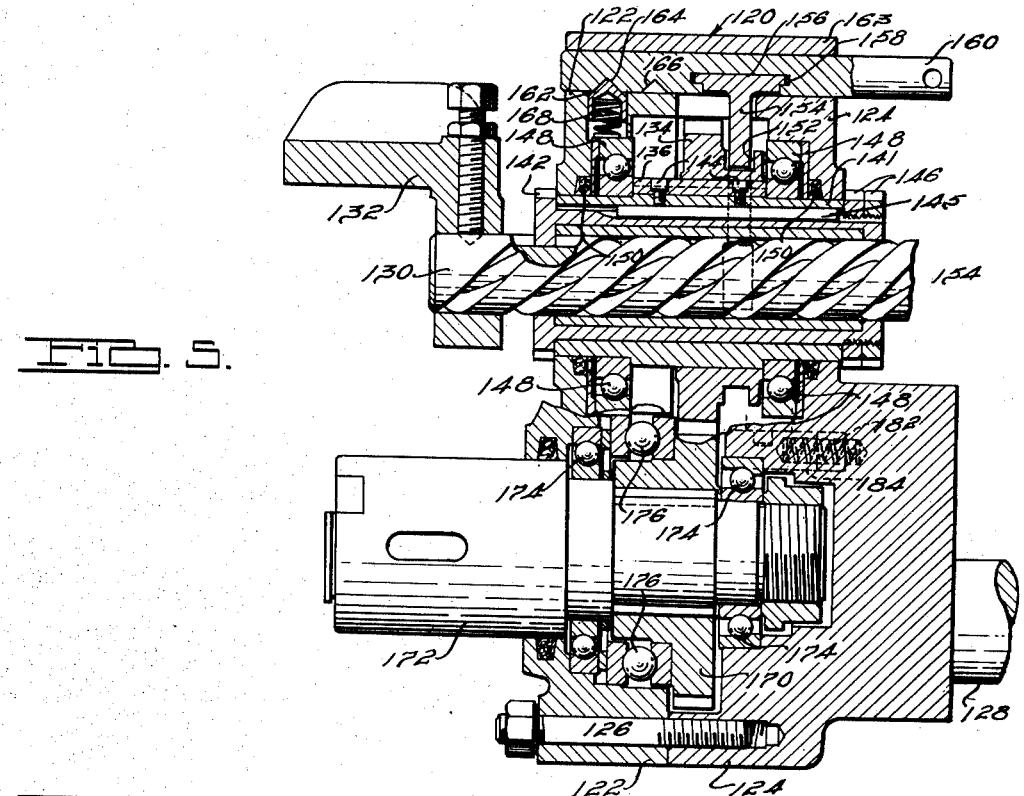
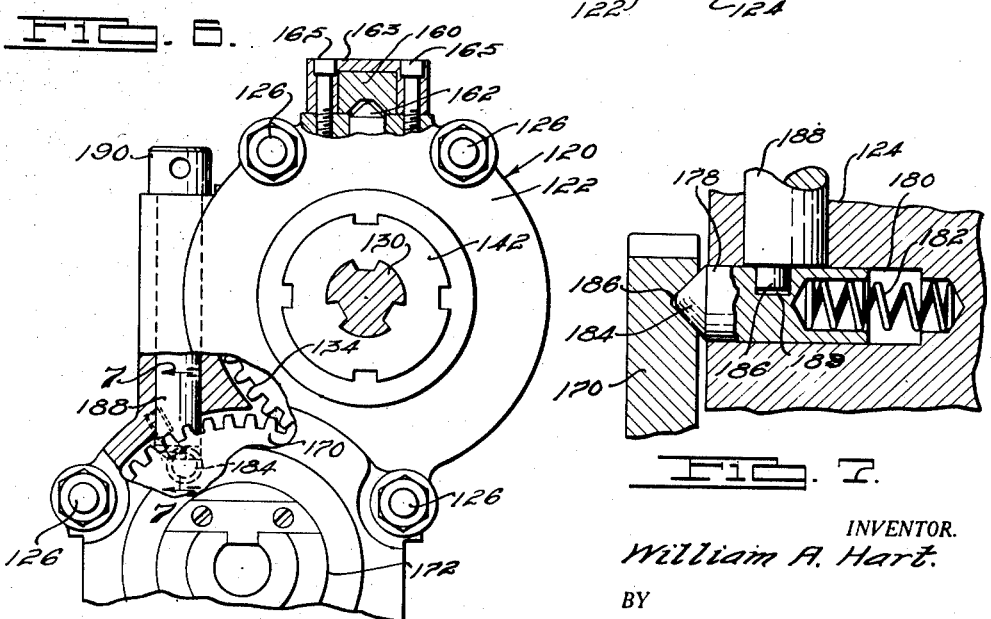
INVENTOR.
William A. Hart.
BY
Harness, Dickey Pierce & Hann.
ATTORNEYS.

Patented May 16, 1939

2,158,720

UNITED STATES PATENT OFFICE 2,158,720

SPIRAL BROACH DEVICE

William A. Hart, Detroit, Mich., assignor to Colonial Broach Company, a corporation of Michigan Application July 19, 1935, Serial No. 32,230

6 Claims. (Cl. 90—33)

The present invention relates generally to machines for operating metal working tools, and more particularly to automatic broaching machines arranged to produce a spiral cutting action.

It is an object of the present invention to provide a broaching machine constructed to cut spiral grooves in circular or other stock.

It is a further object of the present invention to provide a broaching machine of the above type which is conveniently adjustable to produce either a spiral or a straight broaching action.

It is a further object of the present invention to provide a broaching machine embodying mechanism to draw a broach past stock and to simultaneously impart a rotative movement to the broach.

It is a further object of the present invention to provide a broaching machine of the last mentioned type and embodying means to cause the rotative motion of the broaching tool to occur in a definite timed relation to the drawing movement of the broach.

It is a further object of the present invention to provide a broaching machine embodying pullbar mechanism disposed to draw a broaching tool past a work piece and a rotative head disposed to impart rotative movement to the broach.

It is a further object of the present invention to provide a broaching machine of the last mentioned type in which the second or rotative mechanism is actuated by and in accordance with the movement of the first element.

It is a further object of the present invention to provide a broaching machine of the last mentioned type in which the rotative mechanism is supported for movement along a spirally cut lead screw in accordance with the movement of the pull bar mechanism, and is thereby rotated to effect a corresponding rotation of the broaching tool.

It is a further object of the present invention to provide a broachng machine as above mentioned and embodying means to readily disconnect the tool head from the rotation mechanism.

It is a further object of the present invention to provide a broaching machine having a rotatable head, driven along a spiral lead screw by a pullbar to thereby rotate a broaching tool, and embodying indexing mechanism to conveniently adjust the relative angular positions of the lead screw and broaching tool.

It is a further object of the present invention to generally improve and simplify the construction and operation of spiral broaching tools, and to produce a tool which is economical of manufacture and accurate and positive in operation.

Other objects and advantages of the present invention appear in the following description and in the appended claims.

In the drawings, throughout which corresponding reference characters are used to designate corresponding parts, Figure 1 is a view in perspective of a spiral broach machine embodying the present invention;

Fig. 2 is a view in vertical section of a broaching tool head embodying the present invention;

Fig. 3 is a view in vertical end section taken along the lines 3—3 of Fig. 2;

Fig. 4 is a view in end elevation, partly in section, taken along the line 4—4 of Fig. 2;

Fig. 5 is a fragmentary view in vertical section of a modified embodiment of the present invention;

Fig. 6 is a view in end elevation, partly in section, of the embodiment shown in Fig. 5, and Fig. 7 is a fragmentary sectional view of a portion of the indexing mechanism shown in Figs. 5 and 6, and taken along the line 7—7 of Fig. 6.

In the form illustrated, the broaching machine of the present invention, comprises generally a stationary table disposed to support a work piece in cooperative relation to a broaching tool; a tool head having driving and driven rotatable elements, the driven element being connected to a broaching tool, and the driving element being operatively connected to a spiral lead screw; and a pull bar disposed for movement in a rectilinear reciprocatory path and connected to the tool head, so that rectilinear movement of the pull bar effects a corresponding rectilinear movement of the tool head and broach, and effects a rotative movement of the driving element of the tool head to thereby correspondingly rotate the broaching tool in timed relation to the rectilinear movement thereof.

The pullbar may be actuated in various ways, a fluid pressure operated cylinder being shown in the drawings by way of illustration. Similarly, the work piece may be supported on the machine table in various ways, a simple, vertical support being shown in the drawings, adapted to stationarily secure the work piece in position to permit a tool to be drawn through an opening therein. The tool head may comprise generally a housing, directly connected to the pullbar, and within which a rotatable driving element and a rotatable driven element are suitably supported and geared together. The driving element is formed to cooperate with a spirally cut lead screw which is stationarily supported on the machine table in spaced parallel relation to the path of the pullbar. With this arrangement, as will be understood, rectilinear movement of the pullbar, causes the driving element to be rotated by the spirally cut lead screw at a rate determined by the rate of rectilinear movement and by the lead of the spiral.

The driven element, also rotatably supported within the head, as above mentioned, is illustrated as directly geared to the driving element and accordingly is rotated at a rate proportional to the rate of rotation of the driving element. The broaching tool is directly connected to the driven element by an improved form of connection described in more detail hereinafter and rotates directly therewith. The broaching tool is formed with spirally cut teeth, preferably as described and claimed in the patent to Carl J. Halborg, No. 2,011,630, of August 20, 1935, and Axel L. Nilsson, No. 2,060,889, of November 17, 1936, both assigned to the same assignee as the present application. It will be understood, therefore, that as the broaching tool is advanced through the work piece, moving both rectilinearly and rotatively, a spiral groove is cut in the work piece.

In further accordance with one illustrated embodiment of the present invention, the machine is readily convertible to provide either straight or spiral broaching. As illustrated, this conversion is effected by disconnecting the driving and driven elements of the tool head, thus eliminating the rotational movement of the broach. An improved arrangement is also provided to secure the broach in a predetermined rotative position upon disconnection from the driven element.

The present invention also provides for the broaching of a plurality of spirals using a broach having a single row of teeth, by indexing the rotative position of the broach with respect to the lead screw. In accordance with one embodiment, the indexing may conveniently be accomplished by releasing the lead screw and rotating it through a predetermined angle. In accordance with a modified embodiment of the present invention, the indexing is accomplished by disengaging the driving and driven elements of the tool head, and rotating the driven element through a predetermined angle with reference to the driving element.

Considering the above mentioned elements in more detail, and referring first to the perspective view of Fig. 1, the machine 10 is of the horizontal type, and embodies the somewhat elongated channel 12, within which the broaching tool 14, the tool head designated generally 16, and the pullbar 18 are supported. Pullbar 18 is suitably connected for actuation by fluid pressure actuated mechanism comprising the cylinder 20. The machine table also comprises a vertical standard 26, disposed at an intermediate point in channel 12, and against the rear surface 28 of which illustrative work piece 30 is seated.

One end of broaching tool 14 is supported in a clamp 31, which is slidable along a trackway formed on the interior of channel 12. The other end of broaching tool 14 is connected to the driven element of tool head 16, later described. The driven element of tool head 16, later described, is connected to lead screw 32, the opposite ends of which are secured in bosses 33 and 34, which are suitably secured to the machine table. A locking member 36 associated with lead screw 32 is provided to release it so that it may be rotated to effect an indexing action, as later described.

Illustrative control mechanism for cylinder 20 comprises motor 22 which may be connected by belting 24 to a suitable pump (not shown) to supply fluid under pressure to cylinder 20. The starting and stopping may be controlled in any well known manner by the illustrative foot pedal 38. The control elements per se form no part of the present invention and have not been illustrated in detail.

Referring particularly to Figs. 2 and 3, pullbar 18 is rigidly connected to the forwardly extending boss portion 40 of tool head 16. As best shown in Fig. 3, opposite sides of boss 40 are provided with guide grooves 42 which cooperate with rail portions 44 extending inwardly from the sides of channel 12, and which support and guide the movements of the tool head assembly within channel 12. The housing of tool head 16 is formed in two separable portions 46 and 48, which are secured together by studs 50.

The driving element of tool head 16 comprises the gear 52, rotatably supported within the upper portion of members 46 and 48 on the roller bearing assembly 54. Gear 52 is removably but non-rotatably secured to a driving sleeve 56 by key 58, which enters a key-way 60 formed within gear 52 and a corresponding key-way 62 formed on the exterior of sleeve 56. Gear 52 is centered within the housing portions 46 and 48 by the ball bearing assemblies 54 and sleeve 56 is centered with respect to gear 52 by the lock nuts 64, which are threadably secured at one end thereof.

The respective ends of driving sleeve 56 are apertured, and are provided with inwardly extending teeth portions, such as portion 66, which enter grooves 68 cut in the surface of lead screw 32. As best shown in Fig. 3, lead screw 32 is provided with three equi-distantly spaced spiral grooves 68, and it will be understood, therefore, that driving sleeve 56 is provided with a corresponding number of inwardly extending teeth 66. The teeth 66 and grooves 68 form a driving connection between lead screw 32 and gear 52, and it will be understood that rectilinear movement of tool head 16 along lead screw 32, as actuated by pullbar 18 and the associated mechanism, results in rotating gear 52 at a rate determined by the lead of the grooves 68 formed in screw 32.

The left hand end of lead screw 32 is secured by adjusting screw 36 within a bearing boss 34 which is rigidly secured to the previously mentioned upright standard 26 by one or more studs 74. Adjusting screw 36 normally secures lead screw 32 against rotation, but may be backed away to permit a rotative movement of the latter. It will be understood that any rotation of lead screw 32 correspondingly rotates the driving gear 52 and effects a change in the angular relationship between lead screw 32 and the driven portions of the tool head.

The driven element of tool head 16 comprises the gear 76, which meshes with gear 52 and the tool puller sleeve 78, the shank of which is suitably keyed to gear 76 by keys 80, and which extends on one side thereof to provide an engaging portion for broaching tool 14, and extends on the other side thereof to threadedly receive the collar 82. Sleeve 78 and, consequently, gear 76 are rotatably supported within the lower parts of housing portions 46 and 48 on the pair of radial ball bearing units 84 and the thrust ball bearing unit 86. The packing gland 88 is preferably provided, to prevent the escape of lubricant from within the head 16. As will be understood, the ball bearing units 84 and 86 serve to center gear 76 within the housing portions 46 and 48 and that the retaining collar 82 prevents axial movement between sleeve 78 and gear 76.

The puller sleeve 78 is bored out at 90 to receive the end of broaching tool 14. As best shown in Fig. 4, a pin 92 passes through the side opening 94 in sleeve 78 and through a corresponding opening 96 which passes transversely through the end of tool 14, and prevents rotative movement between sleeve 78 and tool 14, as well as limiting axial movement therebetween. Axial relative rotation of tool 14 and sleeve 78 is additionally prevented by the plate 98 which is secured to the face of sleeve 78 by studs 100 and the lower edge of which partially closes off the opening 90 in sleeve 78. It will be understood that the upper edge of tool 14, as viewed in Fig. 4, is correspondingly cut away to accommodate plate 98. Retaining ball 102 is loosely received in an opening 104 formed in sleeve 78 and is biased inwardly to the position shown in Fig. 4 by a spring 106 which seats against a plug 108 threaded into sleeve 78. Pin 92 is recessed at 110 to receive ball 102. Spring 106 is of sufficient stress to retain ball 102 in recess 110 and overcome any tendency of pin 92 to fall out of sleeve 78 during rotation of the assembly but, as will be understood, is weak enough so that pin 92 may be readily withdrawn when desired, to permit the insertion of a broaching tool in puller sleeve 78.

With reference to the operation of the above described embodiment as a whole, it will be understood that the machine is prepared for operation by removing broaching tool 14 from sleeve 78 and slipping a work piece 30 over the puller end thereof. Thereafter, tool 14 is again inserted in sleeve 78 and pin 92 secured in place. Clamp 31 (Fig. 1), is then applied to the following end of tool 14 to maintain the latter in alignment. Work piece 30 is disposed adjacent the rear surface 28 of standard 26, as previously described. Upon actuation of the driving cylinder 20 associated with pullbar 18, which, as above mentioned, may be effected in various well known ways in response to operation of control pedal 38, pullbar 18 and driving head 16 move to the right as viewed in Figs. 1 and 2, thereby drawing tool 14 through work piece 30.

The rectilinear motion of tool head 16 moves driving gear 52 along lead screw 32, causing the former to rotate at a rate determined by the lead of screw 32. This rotation is transmitted to gear 76 and hence to puller sleeve 78 and tool 14. Tool 14, therefore, rotates with respect to work piece 30 at a rate bearing a definite relation to the rate of rectilinear motion thereof. As previously described, the cutting edges of tool 14 are spirally formed, having a lead corresponding to the above ratio between rotative and rectilinear movement. Accordingly, tool 14 cuts a spiral groove on the inner surface of work piece 13, having the same lead as the teeth on tool 14.

The driving mechanism of the present invention may also be used to cut a plurality of definitely spaced spiral grooves in a work piece, through action of a broaching tool having a single spiral of cutting teeth. As previously described, adjusting screw 36 may be backed off to withdraw the end thereof from engagement with screw 32, and to permit rotation of screw 32 within its support. This rotation effects a corresponding rotation of gears 52 and 76 and, consequently, of tool 14. Accordingly, for a particular longitudinal position of the driving head 16 along its path, any desired angular position of broaching tool 14 is possible, and a single groove in work piece 30 may be cut corresponding to each of such angular positions.

It will be understood that the movement of pull bar 18 may be interrupted at the end of a cutting stroke, either automatically or manually in various well known ways. For example, it may be accomplished by the release of pedal 38. Similarly a re-setting movement thereof to the starting position may be accomplished in various ways, such as by reversing the connections to cylinder 20. The mechanism for accomplishing this reversing control forms no part of the present invention and has been omitted from the drawings to simplify them.

The embodiment of the present invention shown in Figs. 5, 6 and 7 is adapted to provide either spiral broaching of a work piece, as described in connection with the first embodiment, or to provide straight broaching of a work piece. This alternative action is accomplished in the form illustrated, by providing means to disconnect the driving and driven portions of the driving head, so that the rectilinear movement of the broaching tool is not accompanied by rotative movement thereof. The arrangement also includes a simple means to lock the driven element in a predetermined, rotative position, and as described in more detail below the locking mechanism may be also used as an indexing arrangement to permit the driven element to be indexed to any one of a plurality of predetermined, angular, rotative positions.

Referring particularly to Figs. 5 and 6, driving head 120 is formed of two separable portions 122 and 124 respectively, which are disposed to be connected together by a plurality of studs 126, such as described in connection with the first embodiment. Pullbar 128 is directly connected to the portion 124 and may be connected to actuating mechanism as described above. Similarly, lead screw 130, which is preferably formed as described in connection with lead screw 32, is suitably supported in stationary relation with respect to the machine by the bearing boss mechanism designated generally 132.

The driving gear 134 is slidably fitted over a sleeve 141, but is secured against rotation with respect thereto by the key 136 which enters a key-way formed in gear 134 and is secured by studs 144 in a key-way formed in sleeve 141. Sleeve 141 is rigidly secured to the driving sleeve 142 by key 145. Driving sleeve 142 and the locking collars 146 associated therewith correspond in all respects to driving sleeve 56 and locking collar 64 described in connection with Fig. 2, and provide a driving connection between gear 134 and lead screw 130. Ball bearing units 148 are interposed between housing portions 122 and 124 and sleeve 141, and the usual packing glands 150 are preferably provided to prevent the escape of lubricant between sleeve 141 and the housing.

Gear 134 is provided with an annular recess 152, within which the two spaced arms 154 of a conventional shifting fork 156 are received. The head of clutch 156 is received within a recess 158 in an actuating bar 160, which is slidably secured within a guide 163. Guide 163 is fixed to the housing by studs 165. The spring biased detent 162 cooperates with notches 164 and 166 in bar 160 to adjustably retain the latter in either a driving or a non-driving position. It will be understood that by forcing bar 160 to the left as viewed in Fig. 5, detent 162 is withdrawn against the force of spring 168, and that gear 134 is moved to the left from the illustrated position, to a position in which it is out of mesh with the driven gear 170.

The driven gear 170 is preferably associated with a puller sleeve 172 in the manner described in connection with Fig. 2, and these elements are rotatably mounted within the housing portions 122 and 124 on the radial ball bearing units 174 and the thrust ball bearing unit 176. It will be understood that puller sleeve 172 may be associated with a broaching tool in the manner described in connection with the first embodiment. It will also be understood that with the parts in the positions illustrated in Fig. 5, in which driving gear 134 is in mesh with driven gear 170, that the operation of the machine corresponds in all respects to the operation of the first described embodiment. It is thought unnecessary, therefore, to further describe such operation.

The mechanism for retaining puller sleeve 172 in a definite rotative position with respect to the driving head 120 comprises the detent 178 which is slidably disposed in a recess 180 bored out of the housing portion 124, and is urged outwardly therefrom by a compression spring 182 which is seated between the end of detent 178 and the housing portion 124. The tapered end 184 of detent 178 is disposed to enter a cooperating recess 186 formed at the rear surface of the driven gear 170.

Trunnion 186, which is eccentrically formed with respect to the adjusting shaft 188, is disposed to enter a cooperating transverse recess 189 formed in detent 178. Shaft 188 is snugly but rotatably supported within the housing portion 124, and is provided at its upper and exterior end with an adjusting head 190. It will be understood that rotation of head 190 causes eccentric trunnion 186 to move in an arcuate path, and to slide within the transverse recess 189 formed in detent 178. The arcuate movement of trunnion 186 effects a longitudinal movement of detent 178, to the right or to the left as viewed in Figs. 5 and 7, into and out of engagement with gear 170.

It will be understood that during the operation of the machine for spiral broaching, with the parts in the positions shown in Fig. 5, that head 190 is maintained in a position in which detent 178 is withdrawn from operative engagement with the driven gear 170, so that the latter rotates freely in response to the rotation of the driving gear 134. To convert the machine for straight broaching, the driven gear 170 is brought to a position in which the recess 186 is opposite detent 178 and is locked in that position by rotating head 190 to move detent 178 into recess 186; and bar 160 is actuated to move gear 134 out of mesh with gear 170. The longitudinal movement of tool head 120 is not accompanied by any rotative movement thereof, and a straight broaching action is effected.

In further accordance with the present invention the rear face of the driven gear 170 may be provided with a plurality of angularly spaced recesses corresponding to the recess 186 shown in Fig. 7, so that gear 170 and puller sleeve 172 may be locked in any one of a plurality of rotative positions with respect to the driving head 120. With this arrangement, it will be evident that a broaching tool having a single row of cutting teeth, as described in connection with the first embodiment, may be used to cut a plurality of straight grooves in a work piece, and having a definite angular spacing between the several grooves. In effecting this, it will be understood that a first groove is cut from an initial or starting position which corresponds to one of the rotative positions of puller sleeve 172 with respect to the driving head 120. Upon completion of the first groove within the work piece, driving gear 134 is moved out of mesh with driven gear 170 by action of clutch bar 160, as above described, and puller sleeve 172 and driven gear 170 are then rotated to a position in which detent 178 is in registry with another of the recesses 186 in gear 170. Thereafter, gear 134 may again be moved into mesh with gear 170 and the cutting of the second groove effected in the same manner as the first groove. Succeeding grooves may be located and cut in a corresponding manner. It will be understood that the number of adjustable positions provided by the recesses 186 should be an even divisor of the number of teeth on gear 170.

Although specific embodiments of the present invention have been shown and described, it will be evident that various changes in the form, number and arrangement of parts may be made in the spirit and scope thereof as defined in the appended claims.

What is claimed is:

1. A machine for operating a broaching tool comprising, in combination, a rectilinearly movable pull bar; a tool head for connecting said pull bar to said broaching tool so that said movement of said pull bar causes rectilinear movement of said broaching tool, said tool head comprising a driven element secured to said broaching tool and a driving element for actuating said driven element; means comprising a spirally cut lead screw for rotating said driving element in timed relation to movement of said pull bar whereby to correspondingly rotate said broaching tool during the rectilinear movement of said broaching tool; and means for stationarily supporting said lead screw against rotation in any of a plurality of rotative positions.

2. A machine for operating a broaching tool comprising, in combination, a rectilinearly movable pull bar; a tool head for connecting said pull bar member to said broaching tool so that said movement of said pull bar causes rectilinear movement of said broaching tool, said tool head comprising a housing, a driven element secured to said broaching tool rotatably journaled in said housing, and a driving element rotatively and slidably journaled in said housing; a member actuable to slide said driving element within said housing into and out of driving relation to said driven element; and means for rotating said driving element in timed relation to movement of said pull bar so as to correspondingly rotate said broaching tool during the rectilinear movement of said broaching tool.

3. A machine for operating a broaching tool comprising, in combination, a rectilinearly movable pull bar; a tool head for connecting said pull bar to said broaching tool so that said movement of said pull bar causes correspondingly rectilinear movement of said broaching tool comprising a housing, a first gear journaled in the housing and secured to the broach, a second gear journaled in the housing and mated with the first gear, and a lead screw stationarily supported by said machine in laterally offset relation to the path of travel of the broach and disposed to engage and rotate the second gear during the rectilinear movement of the pull bar so as to cause said broaching tool to rotate during its rectilinear movement.

4. A machine for operating a broaching tool comprising, in combination, a rectilinearly movable pull bar; a tool head for connecting said pull bar to said broaching tool so that said movement of said pull bar causes correspondingly rectilinear movement of said broaching tool comprising a housing, a first gear journaled in the housing and secured to the broach, a second gear journaled in the housing and mated with the first gear, a lead screw stationarily supported by said machine in laterally offset relation to the path of travel of the broach and disposed to engage and rotate the second gear during the rectilinear movement of the pull bar so as to cause said broaching tool to rotate during its rectilinear movement, and means to adjust the position of the lead screw to adjust the rotative position of the first gear and broach corresponding to a particular point in the rectilinear path of the broach.

5. A machine for operating a broaching tool comprising, in combination, a rectilinearly movable pull bar; a tool head for connecting said pull bar to said broaching tool so that said movement of said pull bar causes correspondingly rectilinear movement of said broaching tool comprising a housing, a first gear journaled in the housing and secured to the broach, a second gear journaled in the housing and mated with the first gear, a lead screw stationarily supported by said machine in laterally offset relation to the path of travel of the broach and disposed to engage and rotate the second gear during the rectilinear movement of the pull bar so as to cause said broaching tool to rotate during its rectilinear movement, and means to slide one of the gears out of mating relation to the other of the gears to interrupt the rotative drive for the broach.

6. A machine for operating a broaching tool comprising, in combination, a rectilinearly movable pull bar; a tool head for connecting said pull bar to said broaching tool so that said movement of said pull bar causes correspondingly rectilinear movement of said broaching tool comprising a housing, a first gear journaled in the housing and secured to the broach, a second gear journaled in the housing and mated with the first gear, a lead screw stationarily supported by said machine in laterally offset relation to the path of travel of the broach and disposed to engage and rotate the second gear during the rectilinear movement of the pull bar so as to cause said broaching tool to rotate during its rectilinear movement, means to slide one of the gears out of mating relation to the other of the gears to interrupt the rotative drive for the broach, and selectively releasable means for locking the first gear in a predetermined rotative position.

WILLIAM A. HART.